(12) United States Patent
Kamon

(10) Patent No.: US 12,511,890 B2
(45) Date of Patent: Dec. 30, 2025

(54) TRAINED MODEL CONVERSION METHOD, INFERENCE METHOD, TRAINED MODEL CONVERSION APPARATUS, TRAINED MODEL, AND INFERENCE APPARATUS

(71) Applicant: FUJIFILM Corporation, Tokyo (JP)

(72) Inventor: Shumpei Kamon, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 342 days.

(21) Appl. No.: 18/188,449

(22) Filed: Mar. 22, 2023

(65) Prior Publication Data

US 2023/0230369 A1 Jul. 20, 2023

Related U.S. Application Data

(63) Continuation of application No. PCT/JP2021/030212, filed on Aug. 18, 2021.

(30) Foreign Application Priority Data

Sep. 28, 2020 (JP) .................................. 2020-162403

(51) Int. Cl.
*G06V 10/82* (2022.01)
*G06N 3/0464* (2023.01)
(Continued)

(52) U.S. Cl.
CPC ........... *G06V 10/82* (2022.01); *G06N 3/0464* (2023.01); *G06N 3/08* (2013.01); *G06V 10/94* (2022.01); *G06V 10/7715* (2022.01)

(58) Field of Classification Search
CPC ........ G06N 3/0464; G06N 3/08; G06V 10/82; G06V 10/94; G06V 10/7715; G06T 2207/20221
See application file for complete search history.

(56) References Cited

U.S. PATENT DOCUMENTS 10,417,562 B2 9/2019 Ioffe et al.
10,628,710 B2 4/2020 Ioffe et al.
(Continued)

FOREIGN PATENT DOCUMENTS

| JP | 2019057072 | 4/2019 |
|---|---|---|
| JP | 2019071080 | 5/2019 |
| WO | 2020082263 | 4/2020 |

OTHER PUBLICATIONS

"Office Action of Japan Counterpart Application", issued on Apr. 12, 2024, with English translation thereof, p. 1-p. 6.
(Continued)

*Primary Examiner* — Daniel G Mariam
(74) *Attorney, Agent, or Firm* — JCIPRNET

(57) ABSTRACT

The present invention provides a trained model conversion method, an inference method, a trained model conversion apparatus, a trained model, and an inference apparatus that are capable of reducing the cost of processing by a regularization layer. A trained model conversion method according to an aspect of the present invention includes a convolutional layer generation step of generating, for a trained convolutional neural network including at least one regularization layer, a second convolutional layer on the basis of a trained parameter of the regularization layer and a trained parameter of a first convolutional layer adjacent to the regularization layer; and a converted model generation step of replacing the regularization layer and the first convolutional layer with the second convolutional layer to generate a converted model which is a converted trained model.

11 Claims, 8 Drawing Sheets

(51) Int. Cl.
  *G06N 3/08* (2023.01)
  *G06V 10/94* (2022.01)
  *G06V 10/77* (2022.01)

(56) References Cited

U.S. PATENT DOCUMENTS

| | | | |
|---|---|---|---|
| 10,902,319 B2 | 1/2021 | Ioffe et al. | |
| 11,003,955 B1* | 5/2021 | Tan | G06V 20/58 |
| 11,281,973 B2 | 3/2022 | Ioffe et al. | |
| 11,308,394 B2 | 4/2022 | Ioffe et al. | |
| 2020/0218964 A1 | 7/2020 | Nakahara | |
| 2020/0257960 A1* | 8/2020 | Gabriel | G06N 3/063 |
| 2021/0216870 A1 | 7/2021 | Ioffe et al. | |
| 2021/0224653 A1 | 7/2021 | Ioffe et al. | |
| 2022/0237462 A1 | 7/2022 | Ioffe et al. | |

OTHER PUBLICATIONS

Duan, Jie et al., "The Speed Improvement by Merging Batch Normalization into Previously Linear Layer in CNN", Proceedings of 2018 International Conference on Audio, Language and Image Processing (ICALIP), IEEE, Jul. 2018. pp. 67-72.

Li, Dawei et al., "DeepRebirth: Accelerating Deep Neural Network Execution on Mobile Devices", Proceedings of the AAAI Conference on Artificial Intelligence, Apr. 2018, pp. 2322-2330.

"International Search Report (Form PCT/ISA/210) of PCT/JP2021/030212," mailed on Nov. 9, 2021, with English translation thereof, pp. 1-5.

"Written Opinion of the International Searching Authority (Form PCT/ISA/237) of PCT/JP2021/030212," mailed on Nov. 9, 2021, with English translation thereof, pp. 1-6.

* cited by examiner

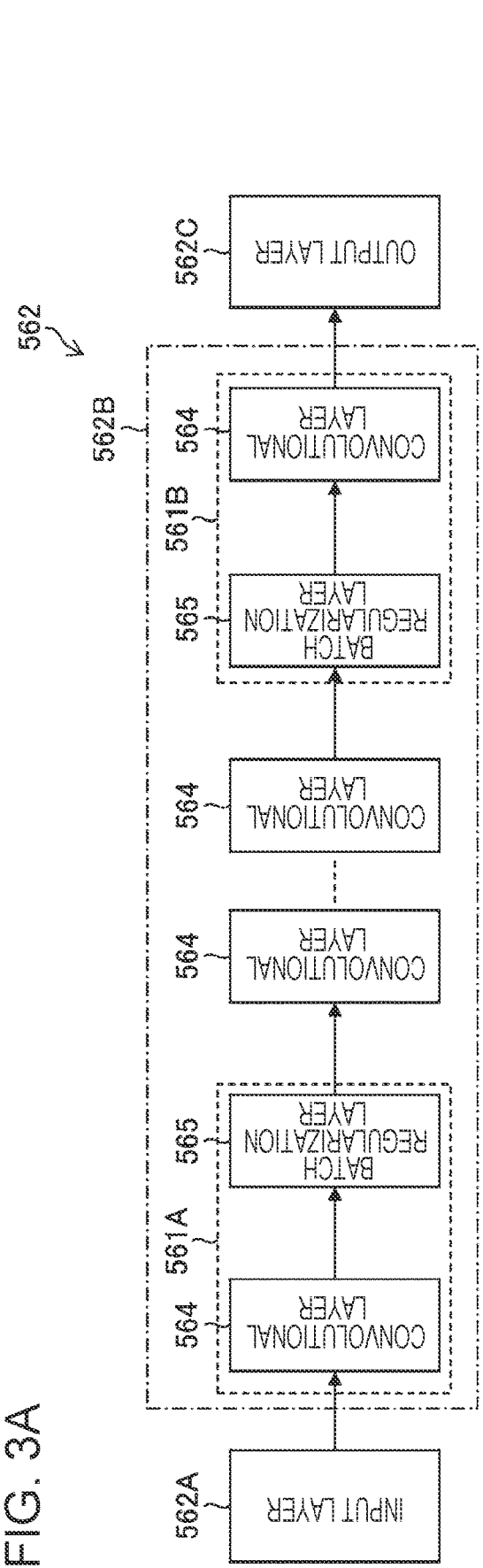
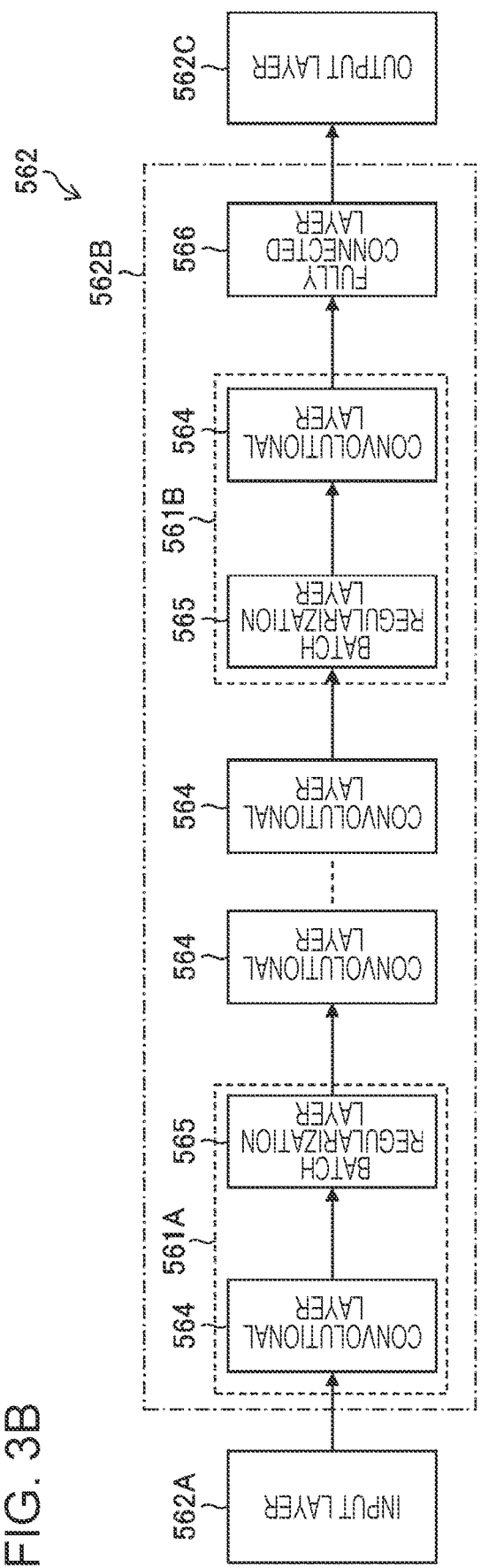

TRAINED MODEL CONVERSION METHOD, INFERENCE METHOD, TRAINED MODEL CONVERSION APPARATUS, TRAINED MODEL, AND INFERENCE APPARATUS

CROSS-REFERENCE TO RELATED APPLICATIONS

The present application is a Continuation of PCT International Application No. PCT/JP2021/030212 filed on Aug. 18, 2021 claiming priority under 35 U.S.C. § 119(a) to Japanese Patent Application No. 2020-162403 filed on Sep. 28, 2020. Each of the above applications is hereby expressly incorporated by reference, in its entirety, into the present application.

BACKGROUND OF THE INVENTION

1. Field of the Invention

The present invention relates to a trained model conversion method, an inference method, a trained model conversion apparatus, a trained model, and an inference apparatus.

2. Description of the Related Art

JP2019-57072A describes using of an equivalent neural network from which a bias of convolutional operation has been removed. JP2019-71080A describes performing of conversion on a feature index using one set of parameters in a case where a convolutional layer precedes a batch normalization layer.

SUMMARY OF THE INVENTION

One embodiment of the present invention provides a trained model conversion method, an inference method, a trained model conversion apparatus, a trained model, and an inference apparatus that are capable of reducing the cost of processing by a regularization layer.

A trained model conversion method according to a first aspect of the present invention includes a convolutional layer generation step of generating, for a trained convolutional neural network including at least one regularization layer, a second convolutional layer on the basis of a trained parameter of the regularization layer and a trained parameter of a first convolutional layer adjacent to the regularization layer; and a converted model generation step of replacing the regularization layer and the first convolutional layer with the second convolutional layer to generate a converted model which is a converted trained model.

In a trained model conversion method according to a second aspect, in the first aspect, in the convolutional layer generation step, the second convolutional layer is generated such that an equal inference processing result is obtained from an input of an identical feature quantity in each of a first processing unit constituted by the first convolutional layer and the regularization layer and a second processing unit constituted only by the second convolutional layer.

In a trained model conversion method according to a third aspect, in the first or second aspect, the regularization layer is a batch regularization layer.

An inference method according to a fourth aspect of the present invention includes a data acquisition step of acquiring input data; and an inference step of inputting the input data to the converted model acquired using the trained model conversion method according to any one of the first to third aspects, and acquiring an inference result.

In an inference method according to a fifth aspect, in the fourth aspect, at least part of the inference step is executed by a parallel computing device.

In an inference method according to a sixth aspect, in the fourth or fifth aspect, in the data acquisition step, time-series data is acquired as the input data.

In an inference method according to a seventh aspect, in the sixth aspect, in the data acquisition step, a moving image of a subject is acquired as the input data.

A trained model conversion apparatus according to an eighth aspect of the present invention includes a processor. The processor is configured to execute a convolutional layer generation process of generating, for a trained convolutional neural network including at least one regularization layer, a second convolutional layer on the basis of a trained parameter of the regularization layer and a trained parameter of a first convolutional layer adjacent to the regularization layer; and a converted model generation process of replacing the regularization layer and the first convolutional layer with the second convolutional layer to generate a converted model which is a converted trained model.

A trained model according to a ninth aspect of the present invention is a trained model to be used by a computer to cause an inference result for input data to be output. The trained model is acquired by executing, with a processor of a trained model conversion apparatus, a convolutional layer generation process of generating, for a trained convolutional neural network including at least one regularization layer, a second convolutional layer on the basis of a trained parameter of the regularization layer and a trained parameter of a first convolutional layer adjacent to the regularization layer; and a converted model generation process of replacing the regularization layer and the first convolutional layer with the second convolutional layer to generate a converted model which is a converted trained model.

An inference apparatus according to a tenth aspect of the present invention includes a processor, and the trained model according to the ninth aspect. The processor is configured to execute a data acquisition process of acquiring input data, and an inference process of inputting the input data to the trained model and acquiring an inference result.

In an inference apparatus according to an eleventh aspect, in the tenth aspect, the processor includes a parallel computing device configured to execute at least part of the inference process.

BRIEF DESCRIPTION OF THE DRAWINGS

FIGS. 3A and 3B are diagrams each illustrating a configuration example of a convolutional neural network;

DESCRIPTION OF THE PREFERRED EMBODIMENTS

Hereinafter, an embodiment of a trained model conversion method, an inference method, a trained model conversion apparatus, a trained model, and an inference apparatus according to the present invention will be described in detail with reference to the accompanying drawings.

Configuration of Trained Model Conversion Apparatus

Figure 1:
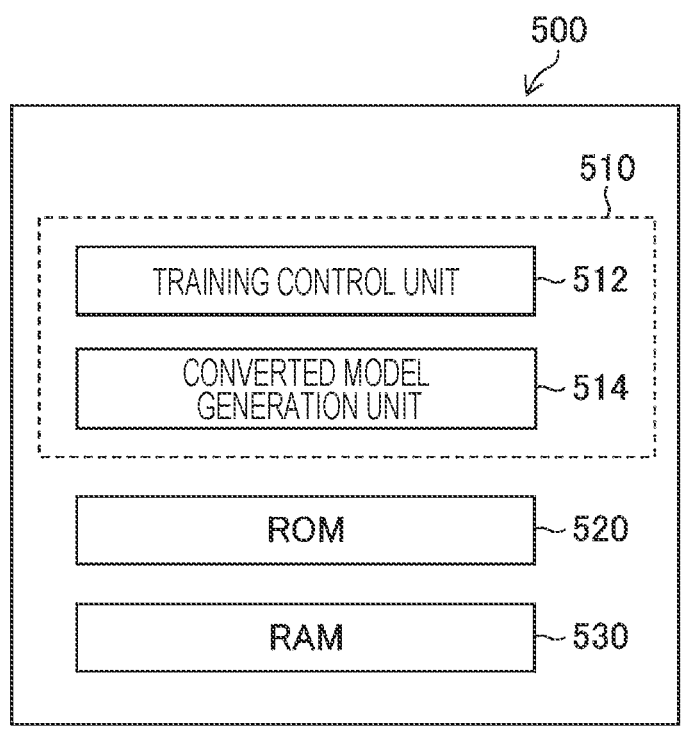
FIG. 1 is a diagram illustrating the configuration of a trained model conversion apparatus.

FIG. 1 is a diagram illustrating the configuration of a trained model conversion apparatus 500 (a trained model conversion apparatus). The trained model conversion apparatus 500 includes a processor 510 (a processor, a computer) including a training control unit 512 and a converted model generation unit 514, a read only memory (ROM) 520 (a non-transitory recording medium, a memory), and a random access memory (RAM) 530. The processor 510 can be constituted by a processor of various types and/or an electric circuit, like a main control unit 210 and an image processing unit 204 of an endoscope system 10 described below (see FIGS. 8 to 11 and the description related to these figures). The ROM 520 stores computer-readable code of a trained model conversion program (a program that causes a computer to execute a trained model conversion method according to the present invention), and various data necessary for executing the trained model conversion method. The code and data may be stored in an electrically erasable and programmable read only memory (EEPROM) or a flash memory instead of the ROM 520. The RAM 530 is used as a temporary storage area or a work area during processing.

Figure 2A:
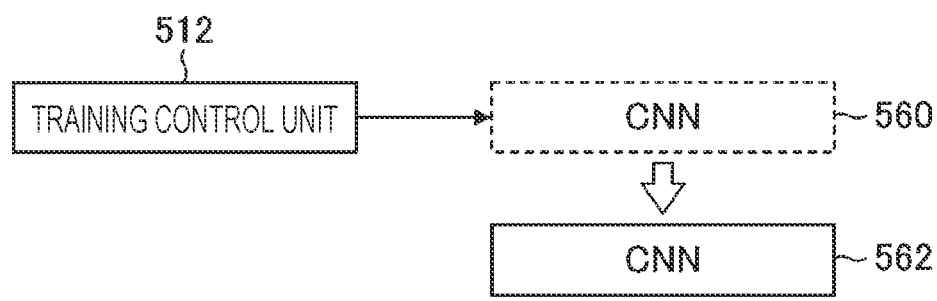
FIGS. 2A and 2B are diagrams illustrating states of training of a convolutional neural network and conversion of a trained model.
Figure 2B:
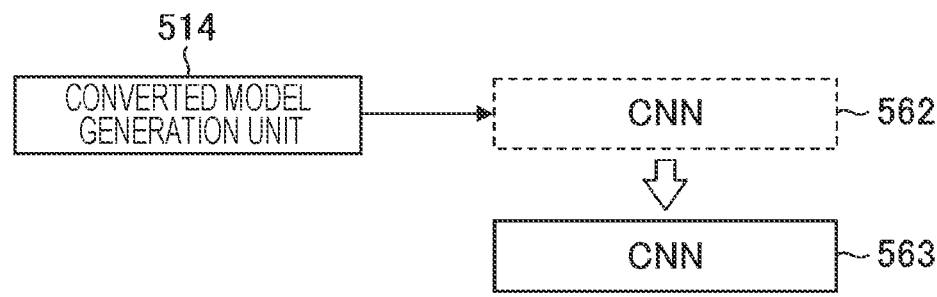

With the above-described configuration, the trained model conversion apparatus 500 performs training of a convolutional neural network (CNN) and conversion of a trained model. FIG. 2A illustrates a state in which a CNN 560 that has not been trained becomes a CNN 562 which is a trained model under control by the training control unit 512. FIG. 2B illustrates a state in which the CNN 562 (a trained model) becomes a CNN 563 (a converted model) under control by the converted model generation unit 514 (a convolutional layer generation step, a converted model generation step). The type of the processing apparatus (a CPU, a GPU, or the like) that converts a trained model is not particularly limited.

Configuration of Convolutional Neural Network

FIGS. 3A and 3B are diagrams each illustrating a configuration example of the CNN 562 (a convolutional neural network; a trained model) (the CNN 560 has a similar configuration). In the example illustrated in FIG. 3A, the CNN 562 has an input layer 562A, an intermediate layer 562B, and an output layer 562C. The input layer 562A receives time-series data (for example, a moving image of a subject or the like, but is not limited thereto; input data) and outputs a feature quantity. The intermediate layer 562B includes convolutional layers 564 (a first convolutional layer) and batch regularization layers 565 (a regularization layer). The intermediate layer 562B receives the feature quantity output from the input layer 562A and calculates another feature quantity. The convolutional layers 564 have a structure in which a plurality of "nodes" are connected by "edges". Weighting coefficients applied to an input image are associated with the nodes and edges and are stored in a weighting coefficient storage unit that is not illustrated. The values of the weighting coefficients change from the initial state (the values in the CNN 560) as the training progresses. In the CNN 562 (a trained model), weighting coefficients in a state in which the training has finished are used.

Figure 5A:
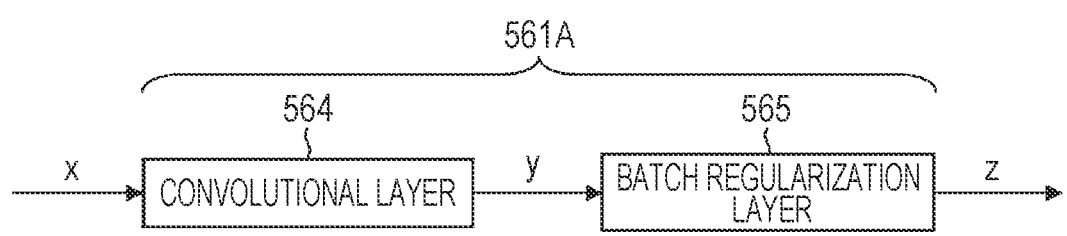
FIGS. 5A and 5B are diagrams illustrating a state of generation of a convolutional layer.
Figure 5B:
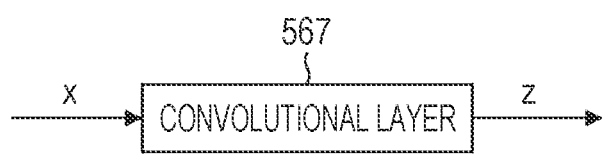
Figure 6A:
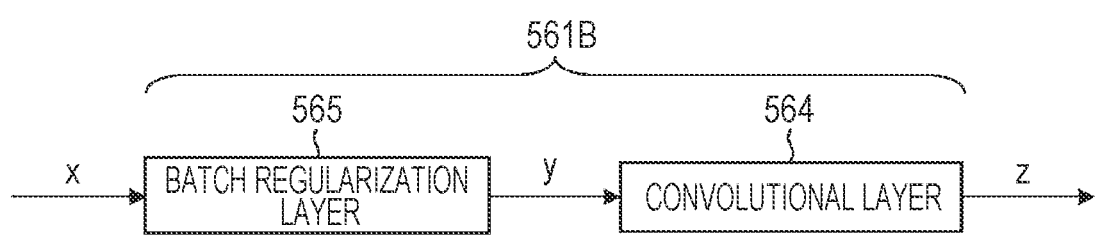
FIGS. 6A and 6B are other diagrams illustrating a state of generation of a convolutional layer.
Figure 6B:
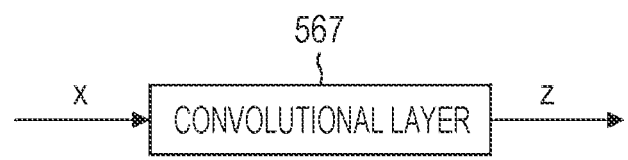

In FIGS. 3A and 3B, in a case where the convolutional layer 564 is on the input side and the batch regularization layer 565 is on the output side as in a conversion target layer 561A, conversion (a convolutional layer generation step, a converted model generation step) described below with reference to FIGS. 5A and 5B is performed. In a case where the batch regularization layer 565 is on the input side and the convolutional layer 564 is on the output side as in a conversion target layer 561B, conversion (a convolutional layer generation step, a converted model generation step) described below with reference to FIGS. 6A and 6B is performed.

Processing in Intermediate Layer

Convolution

The intermediate layer 562B calculates a feature quantity through convolutional operation. The convolutional operation performed in the convolutional layer 564 is processing of acquiring a feature map through convolutional operation using a filter, and plays a role in feature extraction such as edge extraction from an image. As a result of the convolutional operation using a filter, one-channel (one) "feature map" is generated for one filter. The size of the "feature map" is reduced as convolution is performed in each layer in the case of being scaled down by convolution. The intermediate layer 562B can be constituted by one or a plurality of layers that perform convolutional processing.

Figure 4:
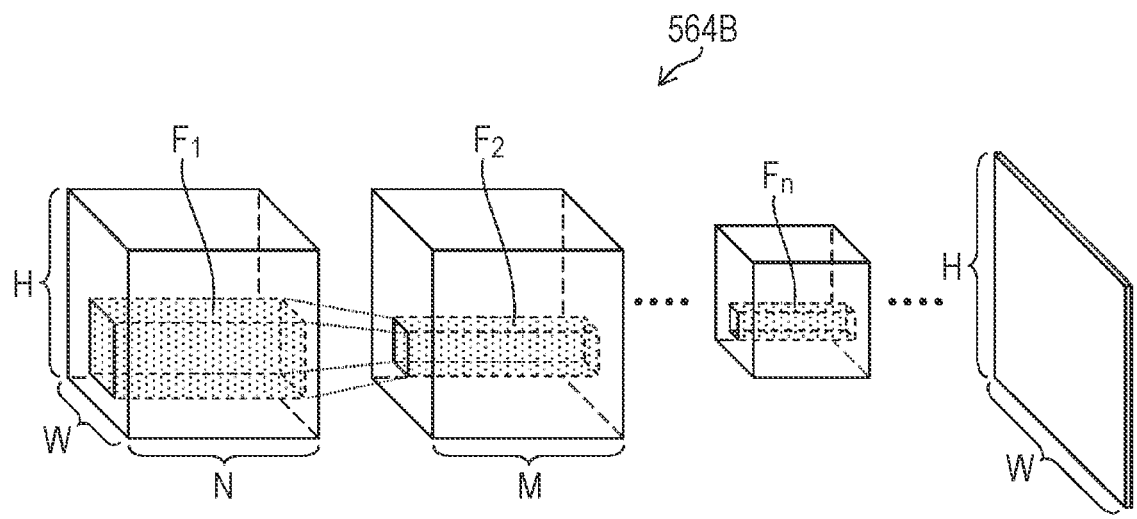
FIG. 4 is a diagram illustrating a state of convolutional processing using filters.

FIG. 4 is a diagram illustrating a state of convolutional processing using filters. In the first convolutional layer of the intermediate layer 562B, convolutional operation of an image set (a training image set in the case of training, an inference image set in the case of inference) constituted by a plurality of medical images (input data) and a filter $F_1$ is performed, for example. The image set is constituted by N (N-channel) images each having an image size in which the height is represented by H and the width is represented by W. In the case of inputting normal-light images, the images constituting an image set are three-channel images of red (R), green (G), and blue (B). The filter $F_1$ convoluted with this image set has a filter size of 5×5×N in the case of the filter having size 5 (5×5), for example, because the image set has N channels (N images). As a result of convolutional operation using the filter $F_1$, one-channel (one) "feature map" is generated for one filter $F_1$. A filter $F_2$ used in the second convolutional layer has a filter size of 3×3×M in the case of the filter having size 3 (3×3), for example.

As in the first convolutional layer, in the second to n-th convolutional layers, convolutional operations using filters $F_2$ to $F_n$ are performed, respectively. The size of the "feature map" in the n-th convolutional layer is smaller than the size of the "feature map" in the second convolutional layer because scaling-down is performed in the convolutional layers in the preceding stages.

In the layers of the intermediate layer 562B, lower-order feature extraction (extraction of edges or the like) is performed in a convolutional layer near the input side, and higher-order feature extraction (extraction of features about the shape, structure, and the like of a recognition target) is performed near the output side.

Regularization

In training of a convolutional neural network, internal covariate shift is suppressed by inserting a regularization layer, and thus improvement in convergence speed and accuracy can be expected. In a regularization layer, statistics such as a mean and a variance of a feature quantity are calculated, and thereby the feature quantity is whitened. There are several types of regularization layers. These regularization layers differ in the range in which the above-described statistics are calculated, as described below. The value of the feature quantity is defined as f(b, x, y, c). Here, b, x, y, and c are indexes of a batch, an X axis, a Y axis, and a channel, respectively.

(1) Batch Regularization

A mean and a variance are calculated in the manner expressed by equations (1) and (2) below, respectively, and whitening is performed on a channel-by-channel basis.

$$\mu_c = \sum_{b,x,y} f(b, x, y, c) \quad \text{Equation (1)}$$

$$\sigma_c^2 = \sum_{b,x,y} \{f(b, x, y, c) - \mu_c\}^2 \quad \text{Equation (2)}$$

(2) Layer Regularization

A mean and a variance are calculated in the manner expressed by equations (3) and (4) below, respectively, and whitening is performed on a batch-by-batch basis.

$$\mu_b = \sum_{x,y,c} f(b, x, y, c) \quad \text{Equation (3)}$$

$$\sigma_b^2 = \sum_{x,y,c} \{f(b, x, y, c) - \mu_b\}^2 \quad \text{Equation (4)}$$

(3) Instance Regularization

A mean and a variance are calculated in the manner expressed by equations (5) and (6) below, respectively, and whitening is performed on a batch-by-batch basis and a channel-by-channel basis.

$$\mu_{b,c} = \sum_{x,y} f(b, x, y, c) \quad \text{Equation (5)}$$

$$\sigma_{b,c}^2 = \sum_{x,y} \{f(b, x, y, c) - \mu_{b,c}\}^2 \quad \text{Equation (6)}$$

(4) Group Regularization

A channel is divided into N groups as expressed by equations (7) and (8) below.

$$G_i \cap G_j = \emptyset \ (i \neq j) \quad \text{Equation (7)}$$

$$\bigcup_i^N G_i = \{1, 2, \ldots, C\} \quad \text{Equation (8)}$$

A mean and a variance are calculated in the manner expressed by equations (9) and (10) below, respectively, and whitening is performed on a group-by-group basis in each batch.

$$\mu_{b_i G_i} = \sum_{c \in G_i} \sum_{x,y} f(b, x, y, c) \quad \text{Equation (9)}$$

$$\sigma_{b_i G_i}^2 = \sum_{c \in G_i} \sum_{x,y} \{f(b, x, y, c) - \mu_{b_i G_i}\}^2 \quad \text{Equation (10)}$$

The layer configuration of the CNN 562 is not limited to the configuration in which the convolutional layers 564 and the batch regularization layers 565 are alternately arranged, and may include a plurality of consecutive convolutional layers 564 or batch regularization layers 565 (for example, convolutional layers 564).

Other Configurations

The CNN 562 may include a pooling layer. The pooling processing performed in the pooling layer is processing of reducing (or enlarging) a feature map output through convolutional operation to create a new feature map, and plays a role in giving robustness so that the extracted feature is not affected by parallel movement or the like. The CNN 562 may include a fully connected layer 566 as in the example illustrated in FIG. 3B.

Conversion of Trained Model: Omission of Regularization Layer at Inference

As described above, there are a plurality of types of regularization methods. The difference therebetween is "which range of feature quantity is used to calculate a statistic", and any method can be implemented in a similar manner in the following discussion. Hereinafter, a description will be given of only batch regularization.

A batch regularization layer is placed before, after, or before and after a convolutional layer in many cases. A batch regularization process can be integrated with an adjacent convolutional layer (convolution and batch regularization can be integrated into one convolution) by using a method described below only at inference. Accordingly, the number of times of memory access during an inference process can be reduced and the speed of calculation can be increased. The method of the present invention is highly effective when inference is performed in a parallel computing device (such as a GPU) where the memory access cost is more dominant in processing time. In the method of the present invention, conversion is performed during an inference process, and a model at the time of training includes a batch regularization layer. In other words, it is possible to omit the processing cost of an inference process of a trained model while obtaining an effect of batch regularization on training.

Conversion Method (Pattern 1)

FIGS. 5A and 5B are diagrams illustrating a state (pattern 1) of conversion of a trained model. Pattern 1 is a process in a case where the convolutional layer 564 is on the input side and the batch regularization layer 565 is on the output side, as in the conversion target layer 561A (a first processing unit) in FIGS. 3A and 3B. The input and output of the convolutional layer 564 are x and y, respectively, and the output of the batch regularization layer 565 is z, as illustrated in FIG. 5A. In this case, a convolution process and a batch regularization process can be formulated as the following equations (11) and (12).

$$y = Wx + b \quad \text{Equation (11)}$$

$$z = \gamma \frac{y - \mu}{\sqrt{\sigma^2 - \epsilon}} + \beta \quad \text{Equation (12)}$$

Here, W and b are trained parameters of the convolutional layer 564 (a first convolutional layer), and γ, μ, σ, ε, and β are trained parameters of the batch regularization layer 565 (a regularization layer). By transforming the above equations, the following equation (13) is obtained.

$$z = \gamma \frac{Wx + b - \mu}{\sqrt{\sigma^2 + \epsilon}} + \beta \qquad \text{Equation (13)}$$

$$= \frac{\gamma}{\sqrt{\sigma^2 + \epsilon}} Wx + \gamma \frac{b - \mu}{\sqrt{\sigma^2 - \epsilon}} + \beta$$

$$= \tilde{W}x + \tilde{b}$$

That is, a process from x to z can be implemented by convolution having W tilde (a weight parameter for convolution in a second convolutional layer 567) and b tilde (a bias component in the second convolutional layer 567) as parameters. The definitions of W tilde and b tilde are expressed by the following equations (14) and (15), respectively.

$$\tilde{W} = \frac{\gamma}{\sqrt{\sigma^2 + \epsilon}} W \qquad \text{Equation (14)}$$

$$\tilde{b} = \gamma \frac{b - \mu}{\sqrt{\sigma^2 + \epsilon}} + \beta \qquad \text{Equation (15)}$$

Accordingly, as illustrated in FIG. 5B, the converted model generation unit 514 is capable of converting the convolution in the convolutional layer 564 and the process for the result thereof in the batch regularization layer 565 into one convolutional layer 567 (a second convolutional layer, a second processing unit) (generation of a second convolutional layer, a convolutional layer generation step, a convolutional layer generation process). That is, in the convolutional layer generation step, the converted model generation unit 514 is capable of generating the convolutional layer 567 (a second convolution layer) such that an equal inference processing result (for example, z above) is obtained from an input of an identical feature quantity (for example, x above) in each of the first processing unit constituted by the convolutional layer 564 (a first convolutional layer) and the batch regularization layer 565 (a regularization layer) and the second processing unit constituted only by the convolutional layer 567 (a second convolutional layer).

In a case where input data is an image, x, y, and z are vectors, W and W tilde (parameters after conversion described in equations (13) and (14)) are weighting coefficient matrices, and b and b tilde (parameters after conversion described in equations (13) and (15)) are matrices indicating bias components.

The converted model generation unit 514 replaces the conversion target layer 561A (the convolutional layer 564 and the batch regularization layer 565; see FIGS. 3A and 3B) with the convolutional layer 567 (a second convolutional layer, a second processing unit) to generate a converted model, which is a converted trained model (a converted model generation step, a converted model generation process).

Conversion Method (Pattern 2)

FIGS. 6A and 6B are diagrams illustrating a state (pattern 2) of conversion of a trained model. Pattern 2 is a process in a case where the batch regularization layer 565 is on the input side and the convolutional layer 564 is on the output side, as in the conversion target layer 561B (a first processing unit) in FIGS. 3A and 3B. The input and output of the batch regularization layer 565 are x and y, respectively, and the output of the convolutional layer 564 is z, as illustrated in FIG. 6A. In this case, a batch regularization process and a convolution process can be formulated as the following equations (16) and (17).

$$y = \gamma \frac{x - \mu}{\sqrt{\sigma^2 + \epsilon}} + \beta \qquad \text{Equation (16)}$$

$$z = Wy + b \qquad \text{Equation (17)}$$

By transforming the above equations as in pattern 1, the following equation (18) is obtained.

$$z = W\gamma \frac{x - \mu}{\sqrt{\sigma^2 - \epsilon}} + W\beta + b \qquad \text{Equation (18)}$$

$$= W \frac{\gamma}{\sqrt{\sigma^2 + \epsilon}} x + W\left(-\frac{\gamma\mu}{\sqrt{\sigma^2 + \epsilon}} + \beta\right) + b$$

$$= \tilde{W}x + \tilde{b}$$

That is, a process from x to z can be implemented by convolution having W tilde (a weight parameter for convolution in a second convolutional layer 567) and b tilde (a bias component in the second convolutional layer 567) as parameters. The definition of W tilde is as expressed by the following equation (19), and the definition of b tilde is as expressed by the following equation (20).

$$\tilde{W} = W \frac{\gamma}{\sqrt{\sigma^2 + \epsilon}} \qquad \text{Equation (19)}$$

$$\tilde{b} = W\left(-\frac{\gamma\mu}{\sqrt{\sigma^2 + \epsilon}} + \beta\right) + b \qquad \text{Equation (20)}$$

Accordingly, as illustrated in FIG. 6B, the converted model generation unit 514 is capable of converting the process in the batch regularization layer 565 and the convolution for the result thereof in the convolutional layer 564 into one convolutional layer 567 (a second convolutional layer, a second processing unit) (generation of a second convolutional layer, a convolutional layer generation step, a convolutional layer generation process). That is, in the convolutional layer generation step, the converted model generation unit 514 is capable of generating the convolutional layer 567 (a second convolution layer) such that an equal inference processing result (for example, z above) is obtained from an input of an identical feature quantity (for example, x above) in each of the first processing unit constituted by the convolutional layer 564 (a first convolutional layer) and the batch regularization layer 565 (a regularization layer) and the second processing unit constituted only by the convolutional layer 567 (a second convolutional layer).

In a case where input data is an image, x, y, and z are vectors, W and W tilde (parameters after conversion described in equations (18) and (19)) are weighting coefficient matrices, and b and b tilde (parameters after conversion described in equations (18) and (20)) are matrices indicating bias components.

The converted model generation unit 514 replaces the conversion target layer 561A (the convolutional layer 564 and the batch regularization layer 565; see FIGS. 3A and 3B) with the convolutional layer 567 (a second convolutional layer, a second processing unit) to generate a converted model, which is a converted trained model (a converted model generation step, a converted model generation process).

Trained Model After Conversion

Figure 7A:
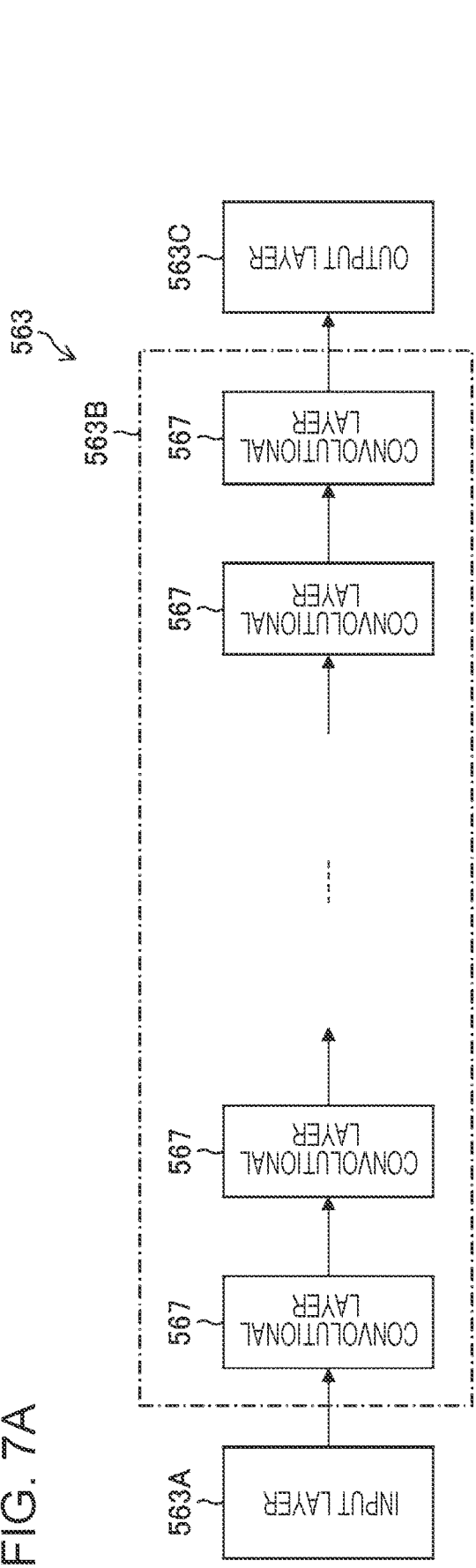
FIGS. 7A and 7B are diagrams each illustrating a configuration example of a converted convolutional neural network.
Figure 7B:
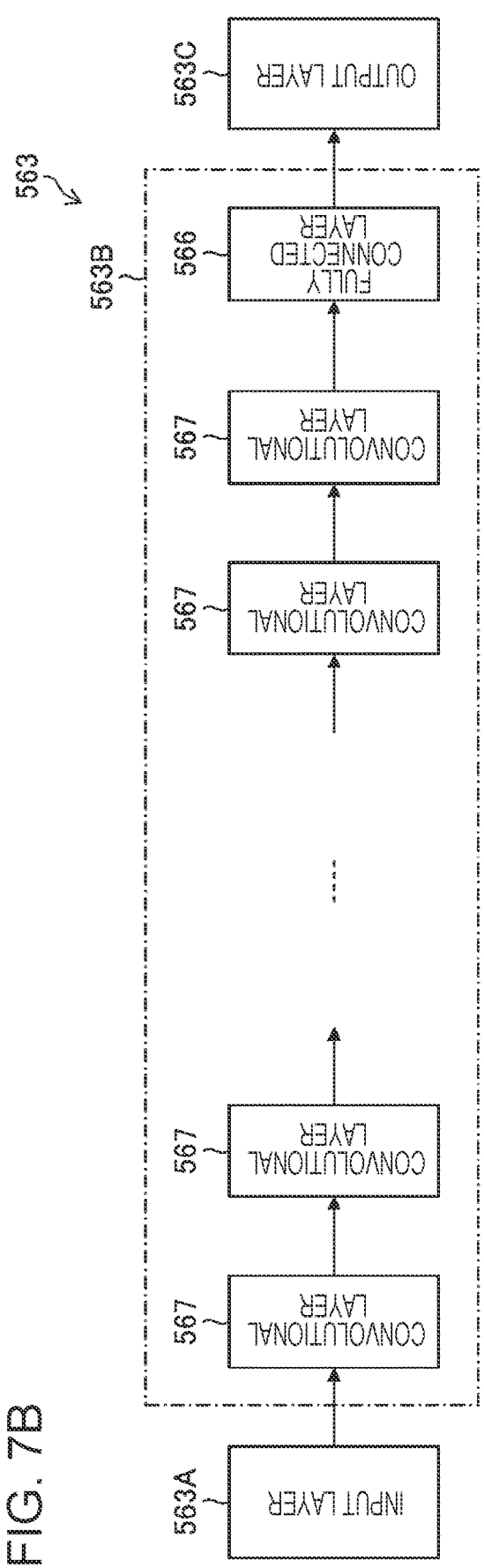

FIGS. 7A and 7B are diagrams each illustrating a configuration example of a converted convolutional neural network (a converted trained model, a converted model). FIG. 7A illustrates a CNN 563 (a converted model; without a fully connected layer) corresponding to FIG. 3A. FIG. 7B illustrates a CNN 563 (a converted model; with a fully connected layer) corresponding to FIG. 3B. The CNN 563 includes an input layer 563A, an intermediate layer 563B, and an output layer 563C. FIGS. 7A and 7B each illustrate an example of a case in which all sets of the convolutional layer 564 and the batch regularization layer 565 have been converted and replaced with the convolutional layers 567. Alternatively, the conversion and replacement may be performed on one or some of the sets.

Figure 8:
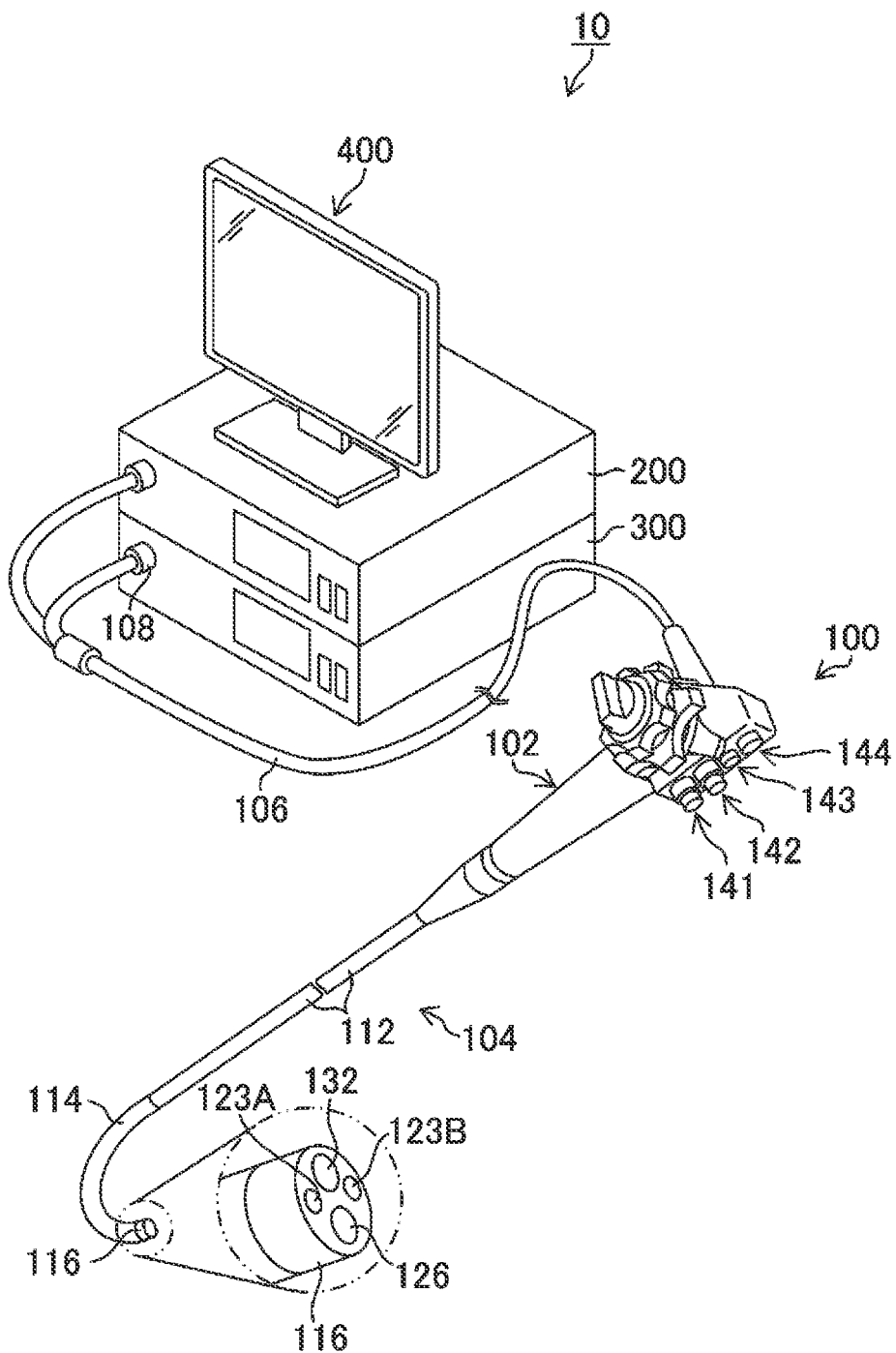
FIG. 8 is an external appearance diagram of an endoscope system as an aspect of an inference apparatus.
Figure 9:
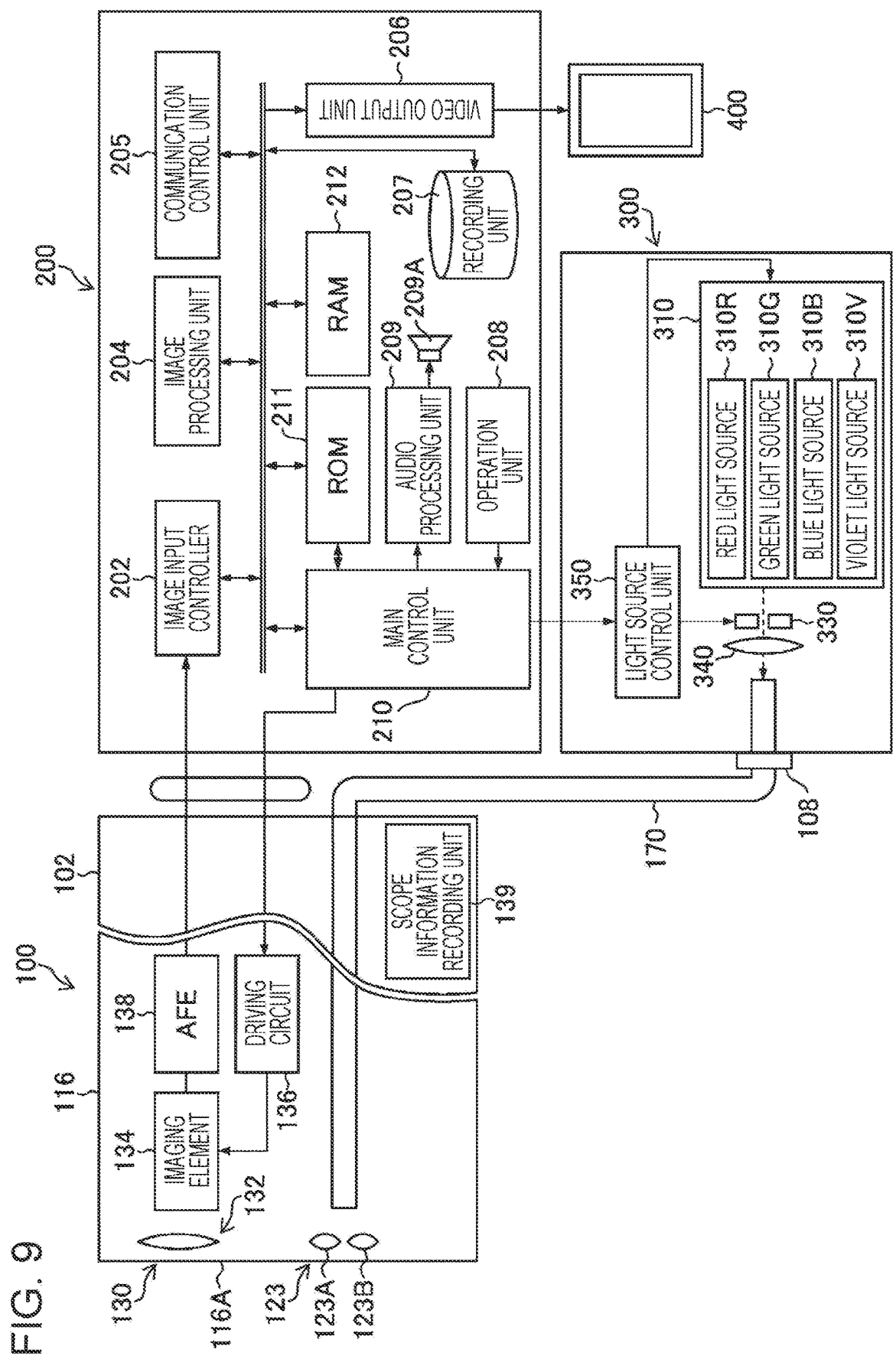
FIG. 9 is a block diagram illustrating the configuration of a main part of the endoscope system.

One Aspect of Inference Apparatus and Inference Method: Application to Endoscope System FIG. 8 is an external appearance diagram of the endoscope system 10 (an endoscope system, a medical image processing apparatus, an inference apparatus) as one aspect of an inference apparatus, and FIG. 9 is a block diagram illustrating the configuration of a main part of the endoscope system 10. As illustrated in FIGS. 8 and 9, the endoscope system 10 is constituted by an endoscope 100 (an image acquiring unit, an endoscope), a medical image processing apparatus 200 (a medical image processing apparatus, a computer, a processor, an inference apparatus), a light source apparatus 300 (a light source apparatus), and a monitor 400 (a display device, a display).

Configuration of Endoscope

The endoscope 100 includes a handheld operation section 102 and an insertion section 104 that communicates with the handheld operation section 102. An operator (a user) operates the handheld operation section 102 while grasping it and inserts the insertion section 104 into a body of a subject (a living body) to perform observation. The handheld operation section 102 is provided with an air/water supply button 141, a suction button 142, a function button 143 to which various functions are allocated, and an imaging button 144 for receiving an imaging instruction operation (a still image, a moving image).

The handheld operation section 102 is provided with a scope information recording unit 139 that records individual information (individual information, scope information) of the endoscope 100. The individual information includes, for example, information on the type (direct view, side view, or the like), the model, the individual identification number, the optical system characteristics (viewing angle, distortion, and so forth), and the tool (treatment tool or the like) used for treatment of a subject, of the endoscope 100. A scope information acquiring unit 204E (a scope information acquiring unit, an individual information acquiring unit; see FIG. 10) of the image processing unit 204 acquires the individual information, which is used for a process (an image acquisition process, an inference process, a display control process) performed by the medical image processing apparatus 200. The scope information recording unit 139 may be provided in another part, for example, in a light guide connector 108.

The insertion section 104 is constituted by a soft part 112, a bending part 114, and a tip rigid part 116, which are arranged in this order from the handheld operation section 102 side. That is, the bending part 114 is connected to a base end side of the tip rigid part 116, and the soft part 112 is connected to a base end side of the bending part 114. The handheld operation section 102 is connected to a base end side of the insertion section 104. The user is able to change the orientation of the tip rigid part 116 in an up, down, left, or right direction by causing the bending part 114 to bend by operating the handheld operation section 102. The tip rigid part 116 is provided with an imaging optical system 130, an illumination unit 123, a forceps port 126, and so forth (see FIGS. 8 and 9).

During observation or treatment, an operation of an operation unit 208 (see FIG. 9) enables white light and/or narrow-band light (one or more of red narrow-band light, green narrow-band light, blue narrow-band light, and violet narrow-band light) to be radiated from illumination lenses 123A and 123B of the illumination unit 123. In addition, an operation of the air/water supply button 141 enables washing water to be ejected from a water supply nozzle that is not illustrated, so that an imaging lens 132 (an imaging lens, an imaging unit) of the imaging optical system 130 and the illumination lenses 123A and 123B can be washed. The forceps port 126 opening in the tip rigid part 116 communicates with a pipe line that is not illustrated, so that a treatment tool that is not illustrated and is for extirpating a tumor or the like can be inserted into the pipe line and necessary treatment can be given to a subject by moving the treatment tool forward or backward as appropriate.

As illustrated in FIGS. 8 and 9, the imaging lens 132 (an imaging unit) is disposed on a distal-end-side surface 116A of the tip rigid part 116. An imaging element 134 (an imaging element, an image acquiring unit) of a complementary metal-oxide semiconductor (CMOS) type, a driving circuit 136, and an analog front end (AFE) 138 are disposed behind the imaging lens 132, and these elements output an image signal. The imaging element 134 is a color imaging element and includes a plurality of pixels constituted by a plurality of light-receiving elements arranged in a matrix (arranged two-dimensionally) in a specific pattern arrangement (Bayer arrangement, X-Trans (registered trademark) arrangement, honeycomb arrangement, or the like). Each pixel of the imaging element 134 includes a microlens, a red (R), green (G), or blue (B) color filter, and a photoelectric conversion unit (a photodiode or the like). An image sensor including the imaging element 134, the driving circuit 136, and the AFE 138 integrated into one package may be used. The imaging optical system 130 is capable of generating a color image from pixel signals of three colors, red, green, and blue, and is also capable of generating an image from pixel signals of any one or two colors among red, green, and blue. The imaging element 134 may be of an XY address type or a charge coupled device (CCD) type. Each pixel of the imaging element 134 may further include a violet color filter corresponding to a violet light source 310V and/or an infrared filter corresponding to an infrared light source.

An optical image of a subject is formed on a light-receiving surface (an imaging surface) of the imaging element 134 by the imaging lens 132, converted into an electric signal, output to the medical image processing apparatus 200 through a signal cable that is not illustrated, and converted into a video signal. Accordingly, an endoscopic image (an observation image, a medical image) of the photographic subject is displayed on the monitor 400, which is connected to the medical image processing apparatus 200.

The illumination lenses 123A and 123B of the illumination unit 123 are provided next to the imaging lens 132 on the distal-end-side surface 116A of the tip rigid part 116. An emission end of a light guide 170, which will be described below, is disposed behind the illumination lenses 123A and 123B. The light guide 170 extends through the insertion section 104, the handheld operation section 102, and a universal cable 106, and an incidence end of the light guide 170 is located in the light guide connector 108.

A user performs imaging (under control of a medical image acquiring unit 204A) at a determined frame rate while inserting or removing the endoscope 100 (the insertion section 104) having the above-described configuration into or from a living body as a subject, thereby being able to sequentially capture time-series images of the inside of the living body (a subject).

Configuration of Light Source Apparatus

As illustrated in FIG. 9, the light source apparatus 300 is constituted by a light source 310 for illumination, a diaphragm 330, a condenser lens 340, a light source control unit 350, and so forth, and causes observation light to enter the light guide 170. The light source 310 includes a red light source 310R, a green light source 310G, a blue light source 310B, and the violet light source 310V that radiate red narrow-band light, green narrow-band light, blue narrow-band light, and violet narrow-band light, respectively, and is capable of radiating red narrow-band light, green narrow-band light, blue narrow-band light, and violet narrow-band light. The illuminance of observation light from the light source 310 is controlled by the light source control unit 350, which is capable of changing (increasing or decreasing) the illuminance of observation light or stopping illumination as necessary.

The light source 310 is capable of emitting red narrow-band light, green narrow-band light, blue narrow-band light, and violet narrow-band light in any combination. For example, the light source 310 is capable of simultaneously emitting red narrow-band light, green narrow-band light, blue narrow-band light, and violet narrow-band light to radiate white light (normal light) as observation light, and is also capable of emitting any one or two of red narrow-band light, green narrow-band light, blue narrow-band light, and violet narrow-band light to radiate narrow-band light (special light). The light source 310 may further include an infrared light source that radiates infrared light (an example of narrow-band light). Alternatively, with use of a light source that radiates white light and a filter that allows white light and each narrow-band light to pass therethrough, white light or narrow-band light may be radiated as observation light.

Wavelength Range of Light Source

The light source 310 may be a light source that generates light in a white range or light in a plurality of wavelength ranges as the light in the white range, or may be a light source that generates light in a specific wavelength range narrower than the white wavelength range. The specific wavelength range may be a blue range or green range in a visible range, or may be a red range in the visible range. In a case where the specific wavelength range is the blue range or green range in the visible range, the specific wavelength range may include a wavelength range of 390 nm or more and 450 nm or less or a wavelength range of 530 nm or more and 550 nm or less, and the light in the specific wavelength range may have a peak wavelength in the wavelength range of 390 nm or more and 450 nm or less or the wavelength range of 530 nm or more and 550 nm or less. In a case where the specific wavelength range is the red range in the visible range, the specific wavelength range may include a wavelength range of 585 nm or more and 615 nm or less or a wavelength range of 610 nm or more and 730 nm or less, and the light in the specific wavelength range may have a peak wavelength in the wavelength range of 585 nm or more and 615 nm or less or the wavelength range of 610 nm or more and 730 nm or less. Here, nm represents "nanometer".

The above-described specific wavelength range may include a wavelength range in which a light absorption coefficient is different between oxyhemoglobin and deoxyhemoglobin, and the light in the specific wavelength range may have a peak wavelength in the wavelength range in which the light absorption coefficient is different between oxyhemoglobin and deoxyhemoglobin. In this case, the specific wavelength range may include a wavelength range of 400±10 nm, a wavelength range of 440±10 nm, a wavelength range of 470±10 nm, or a wavelength range of 600 nm or more and 750 nm or less, and the light in the specific wavelength range may have a peak wavelength in the wavelength range of 400±10 nm, the wavelength range of 440±10 nm, the wavelength range of 470±10 nm, or the wavelength range of 600 nm or more and 750 nm or less.

The wavelength range of the light generated by the light source 310 may include a wavelength range of 790 nm or more and 820 nm or less or a wavelength range of 905 nm or more and 970 nm or less, and the light generated by the light source 310 may have a peak wavelength in the wavelength range of 790 nm or more and 820 nm or less or the wavelength range of 905 nm or more and 970 nm or less.

Alternatively, the light source 310 may include a light source that radiates excitation light whose peak is 390 nm or more and 470 nm or less. In this case, a medical image (an inside-of-living-body image) having information about fluorescence emitted by a fluorescent substance in a subject (a living body) can be acquired. In the case of acquiring a fluorescence image, a pigment for a fluorescence method (fluorescein, acridine orange, or the like) may be used.

It is preferable that the type of the light source 310 (a laser light source, a xenon light source, a light-emitting diode (LED) light source, or the like), the wavelength of the light source 310, the presence or absence of a filter for the light source 310, and so forth be determined in accordance with the type, area, purpose of observation, or the like of a photographic subject. It is also preferable that, during observation, the wavelengths of observation light be combined and/or switched in accordance with the type, area, purpose of observation, or the like of a photographic subject. In the case of switching the wavelength, for example, a disc-shaped filter (a rotary color filter) that is disposed in front of the light source and that is provided with a filter for transmitting or blocking light of a specific wavelength may be rotated to switch the wavelength of light to be radiated.

The imaging element used in the endoscope system 10 is not limited to a color imaging element in which color filters are disposed for the individual pixels, such as the imaging element 134, and may be a monochrome imaging element. In the case of using a monochrome imaging element, imaging can be performed in a frame sequential (color sequential) manner by sequentially switching the wavelength of observation light. For example, the wavelength of outgoing observation light may be sequentially switched among violet, blue, green, and red, or wide-band light (white light) may be radiated and the wavelength of outgoing observation light may be switched by using a rotary color filter (red, green, blue, violet, and the like). Alternatively, one or a plurality of types of narrow-band light (green, blue, violet, and the like) may be radiated and the wavelength of outgoing observation light may be switched by using a rotary color filter (green, blue, violet, and the like). The narrow-band light may be infrared light of two or more different wavelengths (first narrow-band light and second narrow-band light).

As a result of connecting the light guide connector 108 (see FIGS. 8 and 9) to the light source apparatus 300, observation light radiated by the light source apparatus 300 is transmitted through the light guide 170 to the illumination lenses 123A and 123B and is radiated from the illumination lenses 123A and 123B to an observation range.

Configuration of Medical Image Processing Apparatus

The configuration of the medical image processing apparatus 200 will be described with reference to FIG. 9. In the medical image processing apparatus 200, an image input controller 202 receives an image signal output from the endoscope 100, the image processing unit 204 (a processor, a computer) performs necessary image processing thereon, and a video output unit 206 outputs a resulting image signal. Accordingly, an observation image (a medical image, an endoscopic image, an inside-of-living-body image) is displayed on the monitor 400 (a display device). These processes are performed under control by the main control unit 210 (a processor, a computer). A communication control unit 205 controls communication, for acquiring a medical image, with a hospital information system (HIS), a hospital local area network (LAN), and/or an external system or network that are not illustrated.

Functions of Image Processing Unit

Figure 10:
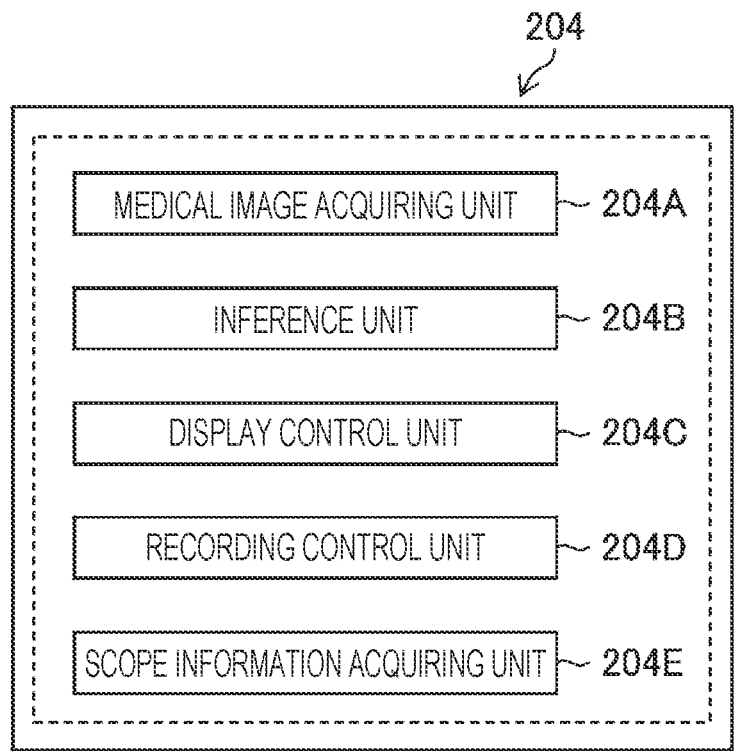
FIG. 10 is a functional block diagram of an image processing unit.

FIG. 10 is a functional block diagram of the image processing unit 204. The image processing unit 204 includes the medical image acquiring unit 204A (a medical image acquiring unit), an inference unit 204B (an inference unit, a region-of-interest recognizing unit), a display control unit 204C (a display control unit), a recording control unit 204D (a recording control unit), and the scope information acquiring unit 204E (a scope information acquiring unit). The inference unit 204B includes a converted model (such as the CNN 563 illustrated in FIGS. 7A and 7B) obtained by using the above-described method (a trained model conversion method according to the present invention).

Processes using these functions will be described below in detail.

The image processing unit 204 is capable of performing, with the above-described functions, recognition (inference) of a medical image, calculation of a feature quantity, a process of emphasizing or reducing a component of a specific frequency band, and a process of emphasizing or deemphasizing a specific target (a region of interest, blood vessels at a desired depth, or the like). The image processing unit 204 may include a special-light image acquiring unit that acquires a special-light image having information about a specific wavelength range on the basis of a normal-light image that is acquired by radiating light in the white range or light in a plurality of wavelength ranges as the light in the white range. In this case, a signal in the specific wavelength range can be acquired through computation based on color information of RGB (R: red, G: green, B: blue) or CMY (C: cyan, M: magenta, Y: yellow) included in the normal-light image. In addition, the image processing unit 204 may include a feature quantity image generating unit that generates a feature quantity image through computation based on at least one of a normal-light image that is acquired by radiating light in the white range or light in a plurality of wavelength ranges as the light in the white range or a special-light image that is acquired by radiating light in a specific wavelength range, and may acquire and display the feature quantity image as a medical image. The above-described processes are performed under control by the main control unit 210.

Implementation of Functions by Various Types of Processors

The functions of the above-described units of the image processing unit 204 and the main control unit 210 can be implemented by using various types of processors and a recording medium. The various types of processors include, for example, a central processing unit (CPU) which is a general-purpose processor that executes software (program) to implement various functions. Also, the various types of processors include a graphics processing unit (GPU) which is a processor dedicated to image processing and which is one aspect of a parallel computing device, and a programmable logic device (PLD) which is a processor whose circuit configuration is changeable after manufacturing, such as a field programmable gate array (FPGA). Furthermore, the various types of processors include a dedicated electric circuit which is a processor having a circuit configuration designed exclusively for executing specific processing, such as an application specific integrated circuit (ASIC).

The function of each unit may be implemented by one processor or may be implemented by a plurality of processors of the same type or different types (for example, a combination of a plurality of FPGAs, a combination of a CPU and an FPGA, or a combination of a CPU and a GPU). A plurality of functions may be implemented by one processor. A first example of implementing a plurality of functions by one processor is that a combination of one or more CPUs and software constitute one processor and the one processor implements the plurality of functions, as represented by a computer. A second example is that a processor that implements the functions of an entire system by one integrated circuit (IC) chip is used, as represented by a system on chip (SoC). In this way, various functions are configured as a hardware structure by using one or more of the above-described various types of processors. Furthermore, the hardware structure of the various types of processors is, more specifically, electric circuitry formed by combining circuit elements such as semiconductor elements. The electric circuitry may be electric circuitry that implements the above-described functions by using logical disjunction, logical conjunction, logical negation, exclusive disjunction, and logical operation as a combination thereof.

When the above-described processor or electric circuitry executes the software (program), the code of the software to be executed that is readable by a computer (for example, the various types of processors or electric circuitry constituting the image processing unit 204, and/or a combination thereof) is stored in a non-transitory recording medium, such as a read only memory (ROM) 211 or a flash memory (not illustrated), and the computer refers to the software. The software stored in the non-transitory recording medium includes a program for executing the medical image processing method (a method for operating a medical image processing apparatus) according to the present invention and data used in the execution (data related to acquisition of a medical image, data used to define a biopsy state or the like and set a mode of distinguishable display, parameters used in a recognizing unit, and so forth). The code may be recorded on a non-transitory recording medium, such as a magneto-optical recording device of various types or a semiconductor memory, instead of the ROM 211. In the processing using the software, a random access memory (RAM) 212 may be used as a transitory storage region, for example, and data stored in an EEPROM that is not illustrated can be referred to, for example. A recording unit 207 may be used as a "non-transitory recording medium".

The read only memory (ROM) 211 is a nonvolatile storage element (a non-transitory recording medium) and stores a computer-readable code of a program that causes the main control unit 210 and/or the image processing unit 204 (a computer) to execute various image processing methods (including the medical image processing method according to the present invention). The random access memory (RAM) 212 is a storage element for temporary storage in various processing operations and can be used as a buffer when acquiring an image. An audio processing unit 209 outputs a message (audio) about medical image processing, an inference result of a region of interest, reporting, or the like from a speaker 209A (a reporting unit, a speaker) under control by the main control unit 210 and the image processing unit 204.

In a case where image processing or recognition is performed in the endoscope system 10, it is effective to configure the image processing unit 204 and/or the main control unit 210 by using a GPU, which is one aspect of a parallel computing device, and to execute at least part of an inference step (an inference process) described below by the GPU.

Operation Unit

The operation unit 208 can be constituted by devices such as a keyboard and a mouse that are not illustrated. A user is able to provide an instruction to execute a medical image processing method (an inference method) or set a condition necessary for the execution via the operation unit 208.

Procedure of Medical Image Processing Method

An example of a medical image processing method (recognition of a region of interest) using the endoscope system 10 will be described. It is assumed that training of the CNN 562 using training data and conversion of a trained model (a convolutional layer generation step and a convolutional layer generation process, a converted model generation step and a converted model generation process; see FIGS. 2A and 2B and so forth) have been executed.

Acquisition of Endoscopic Image

The medical image acquiring unit 204A (a processor) acquires an endoscopic image (a moving image of a subject; an observation image, a medical image) as an example of time-series data (a data acquisition step, a data acquisition process). The medical image acquiring unit 204A may acquire an endoscopic image captured by the endoscope 100, or may acquire an endoscopic image recorded in the recording unit 207. The recording control unit 204D is capable of recording the acquired endoscopic image in the recording unit 207.

Inference (Recognition of Region of Interest)

Figure 11:
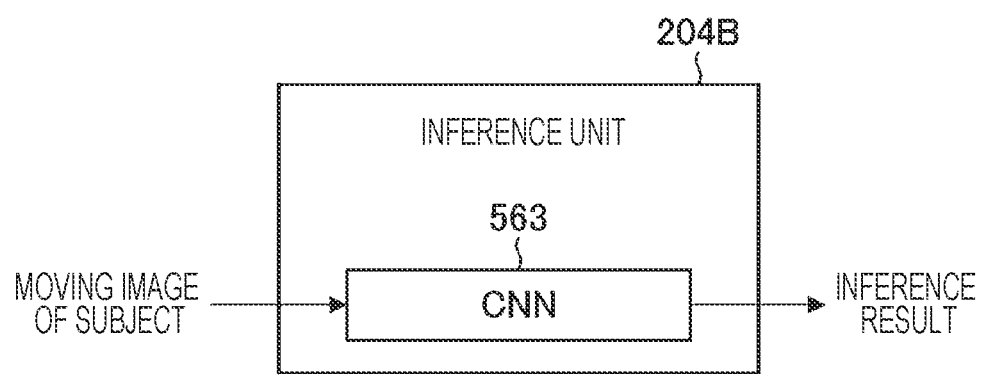
FIG. 11 is a diagram illustrating a state of inference using a converted model.

The inference unit 204B (a processor) recognizes a region of interest from an observation image by using the CNN 563 (a trained model, a converted model) (an inference step, an inference process). Recognition of a region of interest includes detection and discrimination. FIG. 11 is a diagram illustrating a state of inference using a converted model, in which the inference unit 204B inputs a moving image (time-series data) of a subject to the CNN 563 and obtains a detection result and a discrimination result (an inference result). It is preferable that at least part of the inference step (inference process) be performed in a parallel computing device such as a GPU. The inference unit 204B may refer to the individual information of the endoscope 100 in the above recognition (inference).

Display of Observation Image

The display control unit 204C causes the display device to distinguishably display an observation image (a display control step). At this time, the display control unit 204C may distinguishably display a region of interest (display of a character, a figure, or a symbol indicating a region of interest, coloration of a region of interest, or the like).

The main control unit 210 and the image processing unit 204 repeat the above-described process until observation ends.

As described above, according to the endoscope system 10, it is possible to perform inference while reducing the memory access cost by using the CNN 563, which is a converted model, at inference.

Application to Systems Other than Medical Endoscopes

The method of the present invention (a trained model conversion method, an inference method, a trained model conversion apparatus, an inference apparatus, a trained model) can be generally applied to systems that perform real-time processing using a convolutional neural network, as well as to medical endoscopes. For example, the method of the present invention can be applied to medical apparatuses such as an ultrasonographic apparatus and an X-ray fluoroscope that handle time-series data (a moving image of a subject), an industrial endoscope, machine vision, face authentication with a digital camera, a security camera, object recognition with a camera mounted on a moving object such as an automobile or a flying object, and the like. Accordingly, inference can be performed while the memory access cost is reduced.

APPENDICES

In addition to the above-described aspects, the configurations described below are included in the scope of the present invention.

Appendix 1

A medical image processing apparatus (an inference apparatus) wherein
a medical image analysis processing unit (an inference unit) detects a region of interest on the basis of a feature quantity of pixels of a medical image, the region of interest being a region to be focused on, and
a medical image analysis result acquiring unit acquires an analysis result of the medical image analysis processing unit.

Appendix 2

A medical image processing apparatus wherein
a medical image analysis processing unit detects presence or absence of a target to be focused on, on the basis of a feature quantity of pixels of a medical image, and
a medical image analysis result acquiring unit acquires an analysis result of the medical image analysis processing unit.

Appendix 3

The medical image processing apparatus wherein
the medical image analysis result acquiring unit
acquires the analysis result (input data, time-series data) of the medical image from a recording device that records the analysis result, and the analysis result is either or both of the region of interest (a region of concern) which is a region to be focused on included in the medical image and the presence or absence of the target to be focused on.

Appendix 4

The medical image processing apparatus wherein the medical image is a normal-light image acquired by radiating light in a white range or light in a plurality of wavelength ranges as the light in the white range.

Appendix 5

The medical image processing apparatus wherein
the medical image is an image acquired by radiating light in a specific wavelength range, and
the specific wavelength range is a range narrower than a white wavelength range.

Appendix 6

The medical image processing apparatus wherein the specific wavelength range is a blue or green range in a visible range.

Appendix 7

The medical image processing apparatus wherein the specific wavelength range includes a wavelength range of 390 nm or more and 450 nm or less or a wavelength range of 530 nm or more and 550 nm or less, and the light in the specific wavelength range has a peak wavelength in the wavelength range of 390 nm or more and 450 nm or less or the wavelength range of 530 nm or more and 550 nm or less.

Appendix 8

The medical image processing apparatus wherein the specific wavelength range is a red range in a visible range.

Appendix 9

The medical image processing apparatus wherein the specific wavelength range includes a wavelength range of 585 nm or more and 615 nm or less or a wavelength range of 610 nm or more and 730 nm or less, and the light in the specific wavelength range has a peak wavelength in the wavelength range of 585 nm or more and 615 nm or less or the wavelength range of 610 nm or more and 730 nm or less.

Appendix 10

The medical image processing apparatus wherein the specific wavelength range includes a wavelength range in which a light absorption coefficient is different between oxyhemoglobin and deoxyhemoglobin, and the light in the specific wavelength range has a peak wavelength in the wavelength range in which the light absorption coefficient is different between oxyhemoglobin and deoxyhemoglobin.

Appendix 11

The medical image processing apparatus wherein the specific wavelength range includes a wavelength range of 400±10 nm, a wavelength range of 440±10 nm, a wavelength range of 470±10 nm, or a wavelength range of 600 nm or more and 750 nm or less, and the light in the specific wavelength range has a peak wavelength in the wavelength range of 400±10 nm, the wavelength range of 440±10 nm, the wavelength range of 470±10 nm, or the wavelength range of 600 nm or more and 750 nm or less.

Appendix 12

The medical image processing apparatus wherein
the medical image is an inside-of-living-body image depicting an inside of a living body, and
the inside-of-living-body image has information about fluorescence emitted by a fluorescent substance in the living body.

Appendix 13

The medical image processing apparatus wherein the fluorescence is acquired by irradiating the inside of the living body with excitation light whose peak is 390 nm or more and 470 nm or less.

Appendix 14

The medical image processing apparatus wherein
the medical image is an inside-of-living-body image depicting an inside of a living body, and
the specific wavelength range is a wavelength range of infrared light.

Appendix 15

The medical image processing apparatus wherein the specific wavelength range includes a wavelength range of 790 nm or more and 820 nm or less or a wavelength range of 905 nm or more and 970 nm or less, and the light in the specific wavelength range has a peak wavelength in the wavelength range of 790 nm or more and 820 nm or less or the wavelength range of 905 nm or more and 970 nm or less.

Appendix 16

The medical image processing apparatus wherein
a medical image acquiring unit includes a special-light image acquiring unit that acquires a special-light image having information about the specific wavelength range on the basis of a normal-light image that is acquired by radiating light in a white range or light in a plurality of wavelength ranges as the light in the white range, and
the medical image is the special-light image.

Appendix 17

The medical image processing apparatus wherein a signal in the specific wavelength range is acquired through computation based on color information of RGB or CMY included in the normal-light image.

Appendix 18

The medical image processing apparatus including
a feature quantity image generating unit that generates a feature quantity image through computation based on at least one of a normal-light image or a special-light image, the normal-light image being acquired by radiating light in a white range or light in a plurality of wavelength ranges as the light in the white range, the special-light image being acquired by radiating light in a specific wavelength range, wherein
the medical image is the feature quantity image.

Appendix 19

An endoscope apparatus (an inference apparatus) including:
the medical image processing apparatus according to any one of appendices 1 to 18; and
an endoscope that acquires an image by radiating at least any one of light in a white wavelength range or light in a specific wavelength range.

Appendix 20

A diagnosis assistance apparatus (an inference apparatus) including the medical image processing apparatus according to any one of appendices 1 to 18.

Appendix 21

A medical work assistance apparatus (an inference apparatus) including the medical image processing apparatus according to any one of appendices 1 to 18.

The embodiment of the present invention and other examples have been described above. The present invention is not limited to the above-described aspects and various modifications can be made without deviating from the spirit of the present invention.

REFERENCE SIGNS LIST 10 endoscope system
100 endoscope
102 handheld operation section
104 insertion section
106 universal cable
108 light guide connector
112 soft part
114 bending part
116 tip rigid part
116A distal-end-side surface
123 illumination unit
123A illumination lens
123B illumination lens
126 forceps port
130 imaging optical system
132 imaging lens
134 imaging element
136 driving circuit
139 scope information recording unit
141 air/water supply button
142 suction button
143 function button
144 imaging button
170 light guide
200 medical image processing apparatus
202 image input controller
204 image processing unit
204A medical image acquiring unit
204B inference unit
204C display control unit
204D recording control unit
204E scope information acquiring unit
205 communication control unit
206 video output unit
207 recording unit
208 operation unit
209 audio processing unit
209A speaker
210 main control unit
211 ROM
212 RAM
300 light source apparatus
310 light source
310B blue light source
310G green light source
310R red light source
310V violet light source
330 diaphragm
340 condenser lens
350 light source control unit
400 monitor
500 trained model conversion apparatus
510 processor
512 training control unit
514 converted model generation unit
520 ROM
530 RAM
561A conversion target layer
561B conversion target layer
562A input layer
562B intermediate layer
562C output layer
563 CNN
563A input layer
563B intermediate layer
563C output layer
564 convolutional layer
565 batch regularization layer
566 fully connected layer
567 convolutional layer
$F_1$ filter
$F_2$ filter

What is claimed is:

1. A medical image processing method performed by a medical image processing apparatus, the method comprising:
a convolutional layer generation step of generating, for a trained convolutional neural network including at least one regularization layer, a second convolutional layer on the basis of a trained parameter of the regularization layer and a trained parameter of a first convolutional layer adjacent to the regularization layer;
a converted model generation step of generating a converted model by replacing the regularization layer and the first convolutional layer with the second convolutional layer in the trained convolutional neural network, wherein the generation of the converted model is performed for a part of sets of the first convolutional layer and the regularization layer constituting the trained convolutional neural network;
a data acquisition step of acquiring medical image data as input data; and
an inference step of inputting the medical image data into the converted model to obtain an inference result, wherein at least part of the inference step is executed by a parallel computing device.

2. The medical image processing method according to claim 1, wherein in the convolutional layer generation step, the second convolutional layer is generated such that an equal inference processing result is obtained from an input of an identical feature quantity in each of a first processing unit constituted by the first convolutional layer and the regularization layer and a second processing unit constituted only by the second convolutional layer.

3. The medical image processing method according to claim 1, wherein the regularization layer is a batch regularization layer.

4. The medical image processing method according to claim 1, wherein in the data acquisition step, time-series data is acquired as the input data.

5. The medical image processing method according to claim 4, wherein in the data acquisition step, a moving image of a subject is acquired as the input data.

6. A non-transitory, computer-readable tangible recording medium which records thereon a program for causing, when read by a computer, the computer to execute the medical image processing method according to claim 1.

7. A medical image processing apparatus comprising
a processor configured to execute:
  a convolutional layer generation process of generating, for a trained convolutional neural network including at least one regularization layer, a second convolutional layer on the basis of a trained parameter of the regularization layer and a trained parameter of a first convolutional layer adjacent to the regularization layer;
  a converted model generation process of generating a converted model by replacing the regularization layer and the first convolutional layer with the second convolutional layer in the trained convolutional neural network, wherein the generation of the converted model is performed for a part of sets of the first convolutional layer and the regularization layer constituting the trained convolutional neural network;
  a data acquisition step of acquiring medical image data as input data; and
  an inference step of inputting the medical image data into the converted model to obtain an inference result, wherein at least part of the inference step is executed by a parallel computing device.

8. The medical image processing device according to claim 7, wherein in the convolutional layer generation step, the second convolutional layer is generated such that an equal inference processing result is obtained from an input of an identical feature quantity in each of a first processing unit constituted by the first convolutional layer and the regularization layer and a second processing unit constituted only by the second convolutional layer.

9. The medical image processing device according to claim 7, wherein the regularization layer is a batch regularization layer.

10. The medical image processing device according to claim 7, wherein in the data acquisition step, time-series data is acquired as the input data.

11. The inference medical image processing device according to claim 10, wherein in the data acquisition step, a moving image of a subject is acquired as the input data.

* * * * *